United States Patent [19]

Ogawa et al.

[11] 4,292,329

[45] * Sep. 29, 1981

[54] CENTER-FILLED CHEWING GUM

[75] Inventors: Koichi Ogawa, Tokyo; Shichigoro Tezuka, Kawasaki; Masatoshi Terasawa, Tokorozawa; Shizuo Iwata, Tama, all of Japan

[73] Assignee: Lotte Co., Ltd., Tokyo, Japan

[*] Notice: The portion of the term of this patent subsequent to Jun. 5, 1996, has been disclaimed.

[21] Appl. No.: 10,893

[22] Filed: Feb. 9, 1979

Related U.S. Application Data

[63] Continuation-in-part of Ser. No. 875,205, Feb. 6, 1978, Pat. No. 4,157,402.

[51] Int. Cl.³ .................................................. A23G 3/30
[52] U.S. Cl. .......................................... 426/5; 426/654
[58] Field of Search ......................................... 426/3–6, 426/654

[56] References Cited

U.S. PATENT DOCUMENTS

| | | | |
|---|---|---|---|
| 810,210 | 1/1906 | Laws | 426/5 |
| 3,071,476 | 1/1963 | Werft et al. | 426/5 |
| 4,000,321 | 12/1976 | Mochizuki et al. | 426/3 |
| 4,156,740 | 5/1979 | Glass et al. | 426/3 |
| 4,157,402 | 6/1979 | Ogawa et al. | 426/5 |

*Primary Examiner*—Jeanette M. Hunter
*Attorney, Agent, or Firm*—Watts, Hoffmann, Fisher & Heinke Co.

[57] ABSTRACT

A center-filled chewing gum containing a flavored liquid center fill in which a natural emulsifier is added to a flavored liquid center fill.

16 Claims, No Drawings

CENTER-FILLED CHEWING GUM

CROSS-REFERENCE TO RELATED APPLICATION

This application is a continuation-in-part of the following identified application by the same inventors: Ser. No. 875,205, filed on Feb. 6, 1978 for IMPROVEMENT IN AND/OR RELATING TO A CENTER-FILLED CHEWING GUM, now U.S. Pat. No. 4,157,402. The disclosure of said application is incorporated herein by reference.

BACKGROUND OF THE INVENTION

This invention relates to a method of improving the flavor-retaining capacity of a center-filled chewing gum.

A chewing gum containing a liquid or a semi-solid such as a sugar solution, a jam, a jelly and the like as a center fill of the chewing gum has been described in for example the U.S. Pat. No. 810,210. The patent discloses that the wall of the center cavity is coated with a moisture barrier such as butter in order to prevent moisture from penetrating into a gum composition.

Further, the U.S. Pat. No. 3,894,154 discloses a method of retaining a perception of liquidity of the liquid center fill by adding a moisture retention agent such as glycerol to the liquid center fill to retard increase of the viscosity of the liquid fill.

However, it has never been known and experienced to prevent the flavored liquid fill from penetrating into the gum composition by using an additive especially an emulsifier.

On the other hand, it is well-known that natural and synthetic emulsifiers such as sucrose-(higher) fatty acid ester, glycerol-(higher) fatty acid ester, propylene glycol-(higher) fatty acid ester, sorbitan-(higher) fatty acid ester and the like are used for emulsification of food or used in the chewing gum base. However, it has never been known that such emulsifiers are used in the flavored liquid center fill for the purpose of preventing the flavored liquid fill from penetrating thereby to enhance a flavor-retaining capacity of the center-filled chewing gum.

SUMMARY OF THE INVENTION

Now, it has been unexpectedly found that the desired prevention of the flavored liquid fill from penetrating into the surrounding gum composition can be achieved by adding a natural emulsifier to the flavored liquid center fill. In other words, it has been found that the added natural emulsifier has not only its intrinsic emulsifying function but also an unexpected function of preventing the flavored liquid from penetration into the circumferential composition.

Accordingly, an object of the invention is to provide a method of improving the flavor-retaining capacity of a center-filled chewing gum which comprises adding a natural emulsifier to the flavored liquid center fill.

Another object of the invention is to provide a center-filled chewing gum containing a flavored liquid center fill produced by the methods described hereinbefore.

It has not clearly been known why the flavor of the liquid center fill can be prevented from penetration into the circumferential gum composition with use of the natural emulsifier. It is presumed that the flavor component is coated with the emulsifier by its emulsifying and dispersing functions, thus diminishing the chance of contact with the inner wall of the cavity formed in the chewing gum. As a result, undesired penetration of the flavored liquid fill into the gum composition may be avoided.

The flavored liquid fill used in the invention may be any of the types conventionally used such as natural essential oils, flavoring preparations and the like. Examples of the components and composition of the flavored liquid are shown in the following table I.

TABLE I

| Components and Composition of Flavored Liquid | |
|---|---|
| Flavor 0.1–0.5 % by wt. | Essential oils of peppermint, spearmint, orange, lemon and spice series; Flavoring preparations of fruit series Flavoring preparations of coffee, alcoholic liquor etc. |
| Sugar 99.5–99.9 % by wt. | Monosaccharides: glucose, fructose, xylose, galactose etc. Disaccharides: sucrose, lactose, maltose etc. Polysaccharides: raffinose, rhamnose, stachyose etc. Others: arabic gum, corn syrup etc. |

The quantity of the flavored liquid center fill in the chewing gum may be varied widely by selection depending on type of the liquid, formulation of chewing gum base etc. Further, the chewing gum base used in the invention may be any of synthetic resins such as polyvinyl acetate or natural resins such as chicle. The chewing gum base may contain any additives (such as microcrystalline wax, calcium carbonate etc.) if desired.

The emulsifier suitable for use in the invention may be any known natural emulsifier such as lecithin, a natural gum, alginic acid, gelatin, or the like or a mixture thereof. A preferred emulsifier is arabic gum. For the purpose of the invention, natural gums having an emulsifying function and suitable for use in addition to arabic gum include arabinogalactan, ghatti gum, tragacanth gum, karaya gum, curdlan, carrageenan, agar, guar gum, tamarind, pectin, locust bean gum, xanthan gum, puree or the like or a mixture thereof. The quantity of the emulsifier to be added to the flavored liquid may be of 0.01 to 0.5% by weight, preferably 0.02 to 0.2% by weight of the flavored liquid center fill.

The object of the invention, that is to retain the flavor of the liquid center fill, may be achieved by adding only the emulsifier to the flavored liquid as described hereinbefore, but more remarkable effect may be obtained by using the emulsifier in combination with a solvent. The solvent suitably used in the invention includes polyvalent alcohols such as propylene glycol, glycerol, sorbitol polyethylene glycol, malthitol, xylitol and the like as well as other solvents for emulsification. The quantity of the solvent to be added is determined so as not to deteriorate the flavor for which reason it is preferred to reside in the range of 0.01 to 0.1% by weight of flavored liquid center fill. In case of using the emulsifier in combination with the solvent, the quantity of the emulsifier to be added may generally be 0.01 to 0.5% by weight, and preferably 0.02 to 0.3% by weight of the flavored liquid center fill. Addition of the solvent per se has no direct influence to preservation of the flavoring effect. However, the solvent, when used in combination with the emulsifier, serves as a viscosity regulator for the flavored liquid and enhances the emulsifying (coating) and dispersing effects of the emulsifier, resulting in the indirect effect of preventing the flavoring components from penetrating into the gum composition.

As apparent from the foregoing, the flavor-retaining capacity may be increased by adding to the flavored liquid fill the emulsifier alone or in combination with the solvent.

In any case, the flavored liquid after the emulsifier having been added is preferably homogenized to increase the flavor-retaining capacity more remarkably, since the homogenization facilitates the emulsification (coating) to provide finely divided homogeneous flavor dispersions in size of not more than 0.1 micron. The apparatus for use in the homogenizing operation may be of any type known by those skilled in the art, and the homogenizing time is not critical, but preferably it may fall in the range of 10 to 40 minutes per 160 Kg.

As described hereinbefore, the object of the invention, i.e. the flavor-retention of the flavored liquid may be achieved either by adding the emulsifier alone or in an amount of 0.01 to 0.5% preferably 0.02 to 0.2% by weight, or by adding the emulsifier in combination with the solvent, in an amount of 0.01 to 0.5%, preferably 0.02 to 0.3% by weight. In any case, the quantity over the lower or the upper limit may not be employed for practical use, because the lesser quantity results in insufficient coating of the flavor components with the emulsifier, whereas the larger quantity results in undesirably high viscosity of the flavored liquid and gives undesirable taste of the emulsifier per se.

According to the method of the present invention, the following effects may be obtained by adding the emulsifier to the flavored liquid center fill of the chewing gum.

(1) The addition of the emulsifier causes the flavor component to be emulsified (coated) and dispersed in and prevented from separating from the syrup portion. The addition suppresses penetration of the flavor component into the gum composition so that distinction between the gum composition and the liquid center fill may be clearly perceptible.

(2) Emulsification and dispersion of the flavor component with the emulsifier allows the component to remain in the flavored liquid stably for a long time with its enriched freshness and flavoring power as well as strengthened preservation.

DESCRIPTION OF SPECIFIC EMBODIMENT

The following Examples illustrate the invention more in detail.

In the Examples, the rate of penetration of the flavor component into the gum composition is determined by the following analytical procedure.

Internal standard materials are added to a sample of the flavored liquid in the chewing gum which has been stored for 30 days under constant condition (18° C.) after preparation, and to a comparative sample of the flavored liquid immediately after preparation. Each sample is extracted with ether, the resulting extract is subjected to the gas chromatographic analysis and is determined on a relative ratio of the internal standard to menthol. As the internal standard material an alcohol C-10 is used and added in the form of 10% ethanol solution in order to avoid inaccuracy of addition.

At first, 2,000 g of the flavored liquid is weighted by a chemical balance into a 100 ml Erlenmeyer flask, and about 0.1% of the alcohol C-10 based on the flavored liquid is added by a microcylinder. Then, 20 ml of a saturated NaCl solution is added with subsequent covering. The mixture is shaken well to complete dissolution and is transferred to a separatory funnel. Into this funnel 7 ml of ether is added and the mixture is shaken slightly to extract the flavor component. The extraction is repeated three times. The ether is removed from the combined extracts and to the residue added 20 ml of ethanol to give an analytical sample. The sample is subjected to gas chromatography, and the peak area is determined by means of an integrator.

EXAMPLES 1 TO 8

Preparation of flavored liquid:

To a 0.2% peppermint oil was added a natural emulsifier of the type and quantity as shown in Table II hereinafter described. The resulting solution was added to a required quantity (shown in Table II) of mixed syrup of saccharides consisting of 15–25% of sorbitol, 20–30% of invert sugar, 25–40% of malt honey, 4–10% of sucrose and 5–10% of water, and then the solution was either stirred alone or homogenized to give a uniform mixed flavored liquid.

Preparation of the chewing gum base:

The desired chewing gum base was prepared in accordance with the conventional manner by blending the following ingredients.

natural resins—0–20 part
natural waxes—15–25 part
polyvinyl acetate resin—20–30 part
ester gums—15–25 part
synthetic rubbers—5–20 part
others—25–30 part Preparation of the center-filled chewing gum:

The center-filled chewing gum was prepared according to the conventional manner, using the flavored liquid fill and the chewing gum base prepared by the manner as hereinbefore described. In all these examples, ratios of the flavored liquid to the gum base were 12:88.

The center-filled chewing gum thus prepared according to Examples 1 to 8 were determined on the above-mentioned penetration ratio (% after 30 days) of the flavor component according to the above-mentioned analytical procedure and the results are shown in Table II-1 and Table II-2.

TABLE II - 1

| Ingredients | No. 1 | No. 2 | No. 3 | No. 4 |
|---|---|---|---|---|
| Guar gum | | | 0.2 | |
| Tragacanth gum | | | | 0.2 |
| Arabic gum | 0.07 | 0.07 | | |
| Lecithin | | | | |
| Peppermint | 0.2 | 0.2 | 0.2 | 0.2 |
| Propylene glycol | — | — | — | — |
| Syrup | 99.73 | 99.73 | 99.6 | 99.6 |
| Total | 100.00 | 100.00 | 100.0 | 100.0 |
| Homogenization | none | yes | yes | yes |
| Penetration ratio (% after 30 days) | 42.5 | 5.0 | 15 | 10 |

TABLE II - 2

| Ingredients | No. 5 | No. 6 | No. 7 | No. 8 |
|---|---|---|---|---|
| Guar gum | | | | |
| Tragacanth gum | 0.10 | | | |
| Arabic gum | 0.05 | 0.07 | 0.07 | |
| Lecithin | | | 0.05 | 0.07 |
| Peppermint | 0.2 | 0.2 | 0.2 | 0.2 |
| Propylene glycol | — | 0.03 | — | 0.03 |
| Syrup | 99.65 | 99.70 | 99.68 | 99.70 |
| Total | 100.00 | 100.00 | 100.00 | 100.00 |
| Homogenization | yes | yes | yes | yes |
| Penetration ratio | | | | |

TABLE II - 2-continued

| Ingredients | Examples | | | |
| --- | --- | --- | --- | --- |
|  | No. 5 | No. 6 | No. 7 | No. 8 |
| (% after 30 days) | 14 | 10 | 15 | 17 |

Organoleptic test

The center-filled chewing gums prepared in Examples 1 to 8 containing the flavored liquid as the center were organoleptically tested for freshness, flavoring power and strength-preservation of the flavor by a panel of ten members.

All the ten members pointed out that freshness, flavoring power and strength-preservation of the flavor from Example 1 are poor and weak, notwithstanding they unanimously and highly evaluated these properties of the flavor with reference to Examples 2-8.

Various other modifications and changes are contemplated and may be resorted to without departing from the function or scope of the invention as hereinafter defined by the appended claims.

What is claimed is:

1. In a method of making chewing gum having a gum base and a flavored, liquid center fill, the improvement comprising the steps of adding a natural emulsifier to the center fill in an amount of from 0.01-0.50% by weight of the center fill, said natural emulsifier being selected from the group consisting of lecithin, alginic acid, gelatin, natural gums, or a mixture thereof, and thereafter incorporating the center fill with said emulsifier into the base.

2. The method as claimed in claim 1 including the step of homogenizing the mixture of the center fill and the natural emulsifier.

3. The method as claimed in claim 1 including the step of adding a solvent to the center fill with the natural emulsifier.

4. The method as claimed in claim 1 including the steps of adding a solvent to the center fill with the natural emulsifier and homogenizing the resultant mixture.

5. The method as claimed in any one of claims 1, 2, 3 or 4, wherein the emulsifier is a natural gum selected from the group consiting of guar gum, arabic gum and tragacanth gum, or a mixture thereof.

6. The method as claimed in claims 1 or 2 wherein the natural emulsifier is added in an amount of from 0.02-0.2% by weight of the flavored liquid center fill.

7. The method as claimed in claims 3 or 4 wherein the natural emulsifier is added in an amount of from 0.02-0.3% by weight of the flavored liquid center fill.

8. The method as claimed in claims 3 or 4 wherein the solvent is a polyvalent alcohol.

9. The method as claimed in claims 3 or 4 wherein the solvent is added in an amount of from 0.01-0.1% by weight of the flavored liquid center fill.

10. A chewing gum comprising a base and a flavored, liquid center fill admixed with a natural emulsifier present in an amount of from 0.01-0.5% by weight of the center fill, said natural emulsifier being selected from the group consisting of lecithin, alginic acid, gelatin, natural gums, or a mixture thereof.

11. A chewing gum as claimed in claim 10 wherein the emulsifier is a natural gum selected from the group consisting of guar gum, arabic gum and tragacanth gum or a mixture thereof.

12. A chewing gum as claimed in claims 10, or 11 wherein the natural emulsifier is present in an amount of from 0.02-0.2% by weight of the center fill.

13. A chewing gum as claimed in claim 10 including a solvent admixed with the center fill and the natural emulsifier.

14. A chewing gum as claimed in claim 13 wherein the solvent is present in an amount by weight of from 0.01-0.10% by weight of the center fill.

15. A chewing gum as claimed in claim 13 or claim 14 wherein the natural emulsifier is present in an amount by weight of from 0.02-0.30% by weight of the center fill.

16. A chewing gum comprising a base and a flavored homogenized liquid center fill containing a natural emulsifier present in an amount of from 0.01-0.5% by weight of the center fill, said emulsifier being selected from the group consisting of lecithin, alginic acid, gelatin, natural gums, or a mixture thereof.

* * * * *